United States Patent [19]
Min

[11] Patent Number: 5,850,186
[45] Date of Patent: Dec. 15, 1998

[54] METHOD OF RECEIVING RADIO PAGING SIGNAL

[75] Inventor: Yong-Ki Min, Suwon, Rep. of Korea

[73] Assignee: SamSung Electrics Co., Ltd., Suwon, Rep. of Korea

[21] Appl. No.: 792,674

[22] Filed: Jan. 29, 1997

[30] Foreign Application Priority Data

Jan. 29, 1996 [KR] Rep. of Korea ............... 1996/1935

[51] Int. Cl.⁶ ............................................. H04Q 1/00
[52] U.S. Cl. ............... 340/825.44; 455/381; 455/32.1
[58] Field of Search ............. 340/825.44, 825.47, 340/825.52, 825.15, 825.22, 825.48, 825.45, 825.17; 455/185, 186, 185.1, 186.1, 32.1–38.1, 458, 343; 370/94.1, 95.1, 110.1, 50

[56] References Cited

U.S. PATENT DOCUMENTS

| | | | |
|---|---|---|---|
| 4,652,875 | 3/1987 | Waki | 340/825.44 |
| 4,768,032 | 8/1988 | Sharpe et al. | 340/825.47 |
| 4,837,854 | 6/1989 | Oyagi et al. | 455/343 |
| 4,961,073 | 10/1990 | Drapac et al. | 340/825.44 |
| 5,206,855 | 4/1993 | Schwendeman et al. | 370/50 |
| 5,311,516 | 5/1994 | Kuznicki et al. | 370/94.1 |
| 5,381,132 | 1/1995 | Yun | 340/825.44 |
| 5,382,949 | 1/1995 | Mock et al. | 340/825.44 |
| 5,384,564 | 1/1995 | Wycoff et al. | 340/825.44 |
| 5,475,380 | 12/1995 | Shim | 340/825.44 |
| 5,508,688 | 4/1996 | Mochizuki | 340/825.44 |
| 5,542,117 | 7/1996 | Hendricks et al. | 455/343 |
| 5,565,859 | 10/1996 | Matsumoto | 340/480 |

*Primary Examiner*—Michael Horibak
*Assistant Examiner*—Jean B. Jeanglaude
*Attorney, Agent, or Firm*—Robert E. Bushnell, Esq.

[57] ABSTRACT

A method for receiving a normal or an inverted paging signal in a radio pager, which includes the steps of detecting a preamble of a paging signal by reading a cap-code identifying an inherent address of the radio pager and synchronizing with a reference channel frequency; deciding a form of assumption of the paging signal to be received by confirming whether a local area is serviceable according to the detection of a sync code after a predetermined time period; and receiving the paging signal by inverting the same when the local area is not serviceable, and receiving the paging signal as is when the local area is serviceable.

12 Claims, 6 Drawing Sheets

METHOD OF RECEIVING RADIO PAGING SIGNAL

CLAIM FOR PRIORITY UNDER 35 U.S.C. §119

This application makes reference to, incorporates the same herein, and claims all benefits accruing under 35 U.S.C. §119 from an application for Method Of Receiving A Radio Paging Signal earlier filed in the Korean Industrial Property Office on 29 Jan. 1996, and there duly assigned Ser. No. 1935/1996.

BACKGROUND OF THE INVENTION

1. Technical Field

The present invention relates to a pager for receiving a radio paging signal, and more particularly, relates to a method for accurately receiving a radio paging signal transmitted in an inverted form in a radio pager.

2. Background Art

Conventional paging systems, which come in various levels of sophistication, are personal message receiving devices which monitor certain broadcast channel used by paging networks to alert or send information to specific subscriber units known as pagers. Exemplary configurations are disclosed, for example, in U.S. Pat. No. 5,381,132 for Method Of Displaying Self-Address Data In A Pager Receiver issued to Yun and U.S. Pat. No. 5,475,380 for Time Alarm Method Of A Radio Paging Receiver issued to Shim, both of which are assigned to the same assignee of the present invention. Each subscriber pager has an individual identification ID, ie., cap-code stored in the pager. All of the pagers in an area monitor broadcast messages from a base station including a central transmitter. Each message is intended for a particular pager and has that pager's ID associated with the message. Thus, pagers in a particular service area all monitor a certain channel, i.e., frequency for broadcasts from the pager system transmitter looking for its ID. When the ID is present, that is when the ID is broadcast by the central transmitter, the message associated with the ID, which typically follows the ID, is acted upon by the pager.

Typically paging systems also incorporate a variety of battery saving arrangements for improving battery life while concomitantly providing greater reception reliability in weak signal environments such as disclosed, for example, in U.S. Pat. No. 4,652,875 for Pager With Improved Battery Saving Function issued to Waki, U.S. Pat. No. 4,837,854 for Pager Receiver Having A Noise-Immune Verification Circuit For Disabling Battery Saving Operation issued to Oyagi et al., U.S. Pat. No. 4,961,073 for Battery Saving Apparatus And Method Providing Optimum Synchronization Codeword Detection issued to Drapac et al., U.S. Pat. No. 5,382,949 for Method For Increasing Battery Life For Selective Call Receiver issued to Mock et al., U.S. Pat. No. 5,384,564 for Battery Saving Arrangement For Selectively Addressable Portable Receivers issued to Wycoff et al., U.S. Pat. No. 5,508,688 for Selective Pager Receiver issued to Mochizuki, and U.S. Pat. No. 5,542,117 for Method And Apparatus For Battery Saving In A Communication Receiver issued to Hendricks et al.

As the radio pager becomes increasing popular for business and personal communications, however, the number of persons using such a radio pager becomes increasingly larger. As a result, the usable channel becomes increasingly narrower and narrower to accommodate the greater use of many people. Typically, the total number of cap-codes accommodated in each channel is about 0000000 to 2097151, but that number becomes smaller if the word sync or idle code word used in the POCSAG code is excluded. Thus, the number of persons using the same channel is limited.

SUMMARY OF THE INVENTION

Accordingly, it is therefore an object of the present invention to provide an improved paging system for maximizing the usable channel for paging data transmission.

It is also an object to provide a paging system and method for accurately receiving a radio paging signal in an inverted data format in a radio pager.

These and other objects of the present invention can be achieved by a method for receiving a normal or an inverted paging signal in a radio pager which includes the steps of: detecting a preamble of a paging signal by reading a cap-code identifying an inherent address of the radio pager and synchronizing with a reference channel frequency; deciding a form of assumption of the paging signal to be received by confirming whether a local area is serviceable according to the detection of a sync code after a predetermined time period; and receiving the paging signal by inverting the same when the local area is not serviceable, and receiving the paging signal as is when the local area is serviceable.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
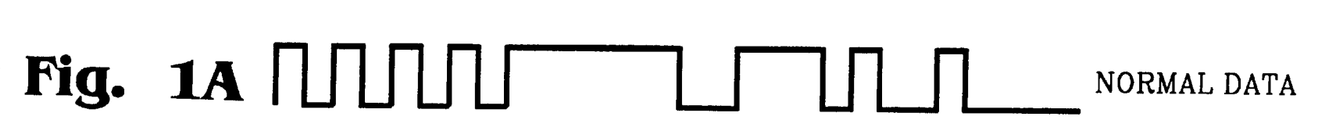
FIGS. 1A and 1B illustrate a waveform of a paging signal in a normal data format and an inverted data format.
Figure 1B:
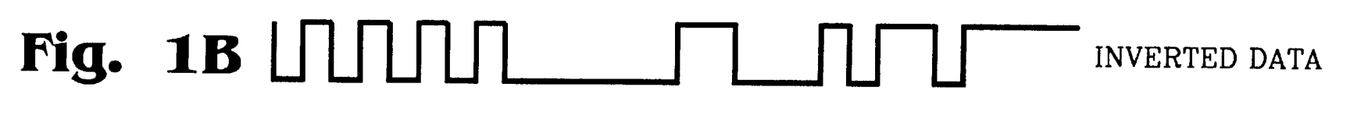

Referring now to the drawings and particularly to FIGS. 1A and 1B, which illustrate a waveform of a radio paging signal transmitted in one of a normal data format and an inverted data format from a paging terminal (not shown). If necessary, the radio paging signal can be transmitted in a normal data format as shown in FIG. 1A and in an inverted data format as shown in FIG. 1B. Typically radio pager can only detect the radio paging signal transmitted in a normal data format as shown in FIG. 1A. An inverted data format as shown in FIG. 1B will be treated as noise and only preamble data is recognized. However, if the radio paging signal is transmitted in an inverted data format as shown in FIG. 1B, the radio pager can be constructed as contemplated by the present invention to detect only the inverted data format signal. As a result, the usable channel for paging data transmission according to the principles of the present invention is maximized.

Figure 2A:
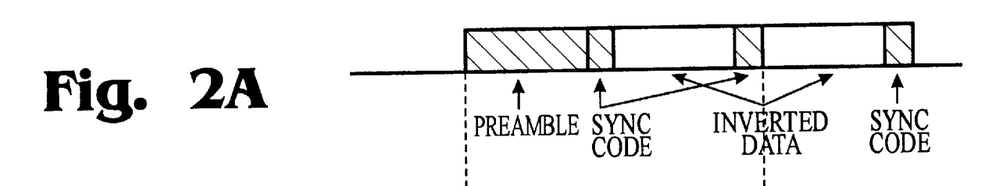
FIGS. 2A and 2B illustrate a transmission state of a paging signal in a normal data format and an inverted data format.
Figure 2B:
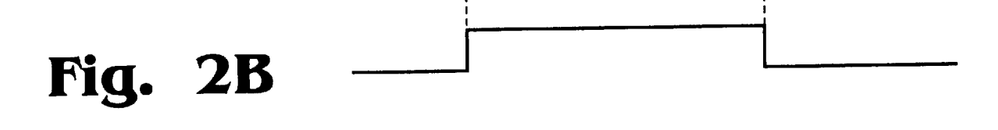

FIG. 2A illustrates a transmission of a battery save signal in accordance with the radio paging signal of FIG. 2A. As shown in FIG. 2A, if inverted data is transmitted, the radio pager searches a preamble and then a sync code. Because to the transmission of inverted data, the sync code (7CD215D8) is now transmitted to 832DEA27 when normal. Therefore, the radio pager searching for the sync code of 7CD215D8 fails to receive its own cap-code as well as the sync code. Accordingly, the battery save signal is maintained at a high state until the inverted data is detected. When the battery save signal turns low, an RF unit of radio pager is turned off so that the radio pager can no longer receive the next sync code.

Figure 3:
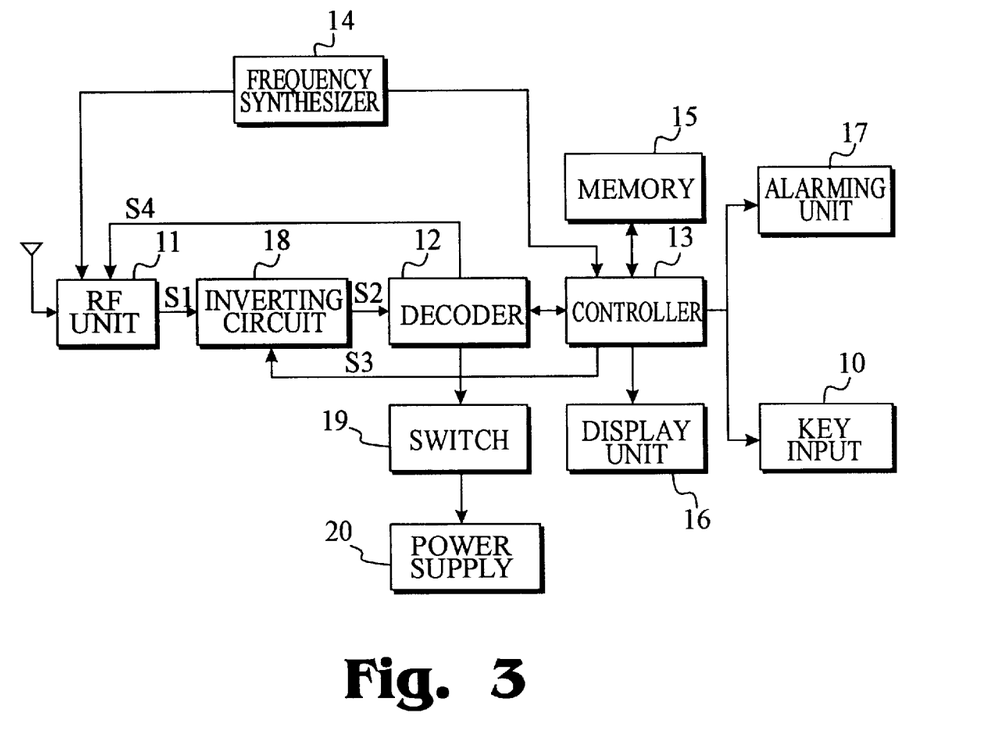
FIG. 3 is a block diagram for illustrating a radio pager having power saving function as constructed according to the principles of the present invention.

FIG. 3 illustrates a radio pager constructed according to the principles of the present invention. The radio pager is for selectively receiving a plurality of paging signals which are specific to the pager. Each of the paging signals includes a calling number and a text message following the calling number and is transmitted as a radio signal from a paging terminal (not shown). The calling number represents a number assigned to the radio pager to which the message should be directed. It should also be noted that a reference channel frequency is data for setting a frequency used by an area subscriber, indicating phase-locked loop (PLL) data of a frequency synthesizer. A service channel frequency is data for setting a frequency used by an wide area subscriber, indicating PLL data of a frequency synthesizer. A cap-code is a radio pager's own address and its prescribed lead bits carries an information of subscribed area A range of area is an area where a radio paging service is performed by a same frequency, and analogous to a cell of a mobile communication system. A range of common area is an area where one common channel frequency is used by areas remotely apart from one another.

As shown in FIG. 3, the radio pager has an antenna, a key inputter 10 including alpha-numeric keys including a power key, a power saving mode key for performing a channel scan operation periodically and a lead key for displaying a received message, a radio-frequency (RF) unit 11, a decoder 12, a controller 13 for controlling overall operations, a frequency synthesizer 14, a memory 15 including a read-only-memory (ROM) for storing a program which controls the overall operations of the pager, a random-access-memory (RAM) for defining a work space needed for pager operations, and an electrically erasable PROM for storing address information and frame information allocated to the pager including its own address data with area information, a CAP code of frame data, reference channel frequencies for setting channels of areas and service channel frequencies for receiving radio paging service, a display unit 16 for displaying the text message from a caller and state information of the pager, an alarm circuit 17 for alerting the user of an incoming call, an inverting circuit 18.

In operation, the controller 13 controls a radio paging service function by analyzing information contained in the memory 15 and performs a channel scan function. The controller 13 designates a reference channel accessed from the memory 15 successively and periodically, and searches for receipt of a paging signal of a designated service channel from an antenna. When the paging signal is received from an antenna, the paging signal is amplified and demodulated by the RF unit 11. The RF unit 11 is typically a circuit arrangement comprised of a high frequency amplifier, a frequency converter, an intermediate frequency (IF) amplifier and a discriminator. The output of the RF unit 11 is then applied, after being wave-shaped, to a decoder 12 via an inverting circuit 18.

As the paging signal is being amplified and demodulated by the RF unit 11, the controller 13 analyzes frame data from the designated service channel after deciding where a radio pager is being located by analyzing area information contained in its cap-code, and sets a power saving mode during performing a channel scan mode for controlling power supply to the RF unit 11 when the reference channel is not scanned within a predetermined time period. The operation of power saving mode is known in the pager art, and thus need not be described in detail herein.

The frequency synthesizer 14 designates a channel of the RF unit 11 according to channel data generated from the controller 13. The channel data includes reference channel frequencies for designating a reference channel frequency of an area and service channel frequencies for performing a radio paging service of wide area subscribers. The inverting circuit 18 determines which signal to be sent to the decoder 12 by selecting either an inverted paging signal or a normal paging signal S1 from the RF unit 11 according to an inverting enable signal S3 from the controller 13. The power supply 20 supplies operation power to the radio pager. The switch 19 converts a power supply to batch mode or idle mode under the control of the decoder 12.

When the address code contained in the paging signal received through the antenna coincides with the pager's unique cap-code, the decoder 12 activates the controller 13 and then applies the text message data included in the paging signal received through the antenna to the controller 13. When the controller 13 receives the text message data, a central processing unit (CPU) included therein activates the display unit 16 to provide a visual display of the text message data. The CPU also activates the alarm unit 17 including one of, or a combination of a buzzer (not shown), a vibrator (not shown) and a lamp (not shown) for alerting the user of an incoming call in dependence upon an operation mode, i.e., whether the radio pager operates in one of an audible alert mode and an inaudible alert mode.

Figure 4:
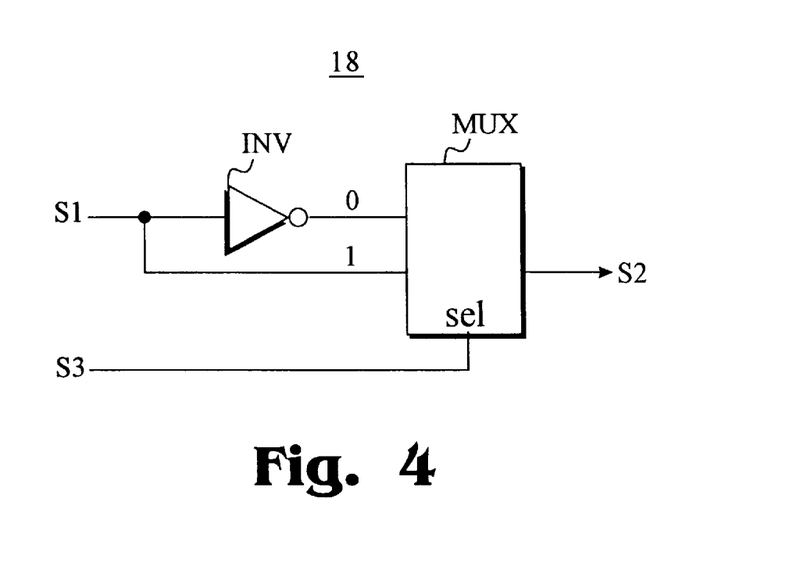
FIG. 4 is a schematic circuit diagram of an inverting circuit as shown in FIG. 3.

FIG. 4 illustrates a construction of the inverting circuit 18 as shown in FIG. 3. The inverting circuit 18 includes an inverter INV and a multiplexer MUX. The multiplexer MUX has a first input terminal coupled to receive a signal S1 from the RF unit 11 as is and a second input terminal coupled to receive a signal S1 from the RF unit 11 inverted by the inverter INV. A selection end of the multiplexer receives an inverting enable signal S3 from the controller 13.

Figure 5:
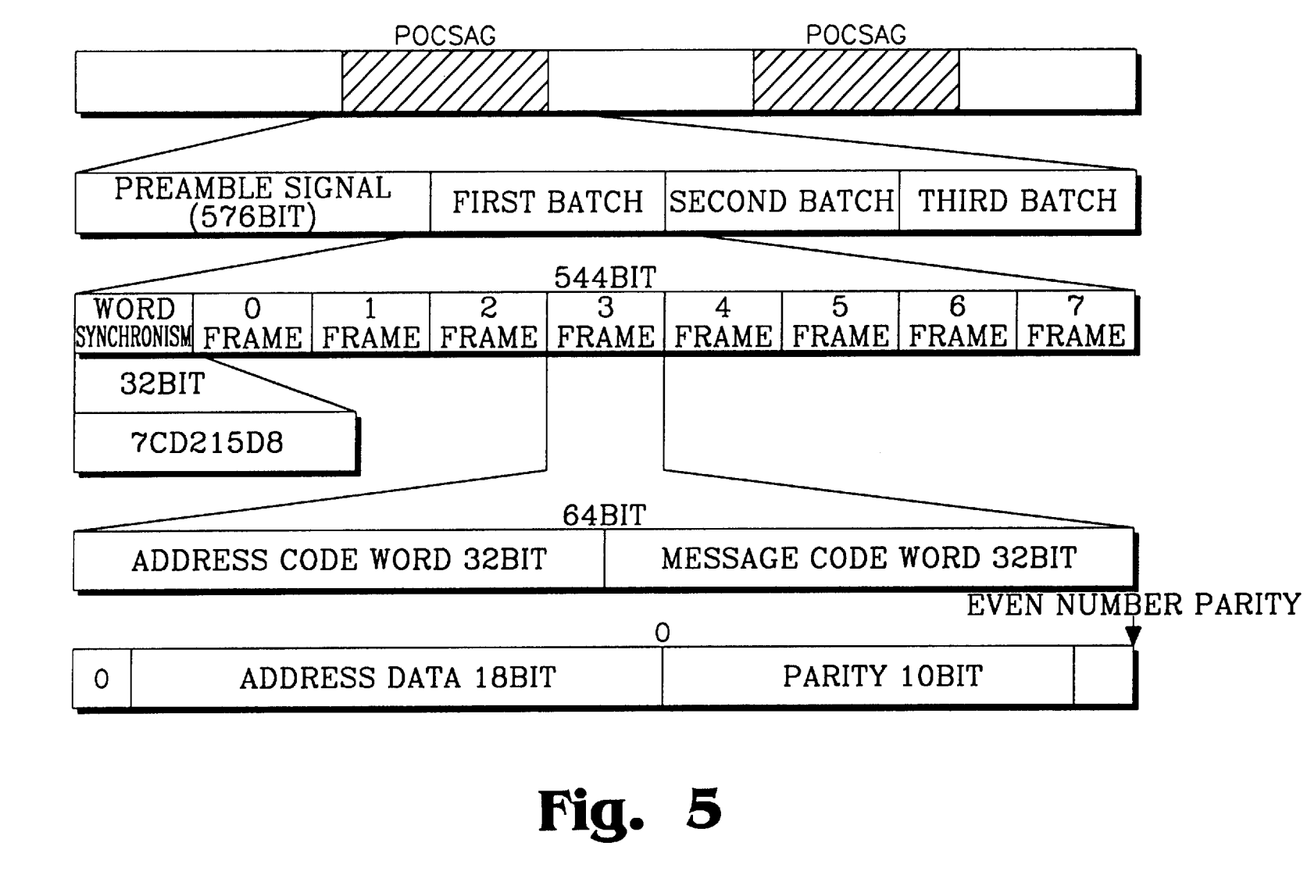
FIG. 5 illustrates a POGSAG code used in a radio pager as shown in FIG. 3.

FIG. 5 represents a form at of a POCSAG code used in the radio pager constructed according to the principles of the present invention. POCSAG code is a signal type for pagers adopted throughout the world and shown in detail in CCIR recommendation 584.

Each POCSAG code is comprised of a preamble data of 576 bits and a plurality of batch data. Preamble data is a reversal code that 1 and 0 repeat during 576 bits. Each POCSAG code contains at least thirty (30) batches of data up to the maximum of sixty (60) batches. Each batch of data is comprised of word sync data of 32 bits and eight (8) frames of data of 64 bits. Here, the word sync data is 32-bit data of "(7CD215D8)H and (01111100 11010010000101011101100)B." In addition, each frame data is comprised of an address codeword of 32 bits and a message codeword of 64 bits. Each address codeword is constituted by the address data of eighteen (18) bits, the parity data of ten (10) bits, one (1) bit for identification of an address codeword, two (2) bits of function bits and one (1) bit of even parity. Thus, each batch is constituted by a 544-bit data (17 words×32 bits=544 bits) of 17 words, with each word is a 32-bit data. The preamble data is used for synchronization with a clock bit, and the word sync data synchronizes a codeword such as address, message, idle, etc. transmitted with word synchronism.

Figure 6A:
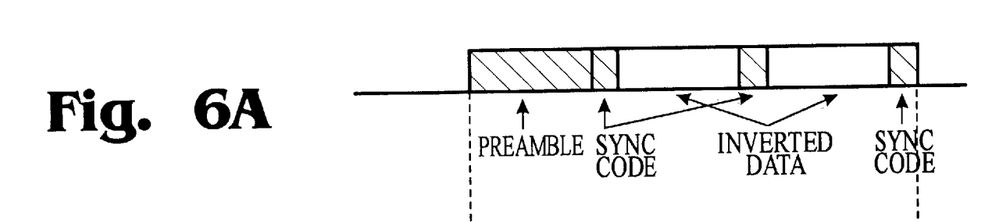
FIGS. 6A and 6B illustrate a detection of a paging signal in an inverted data format according to the principles of the present invention.
Figure 6B:
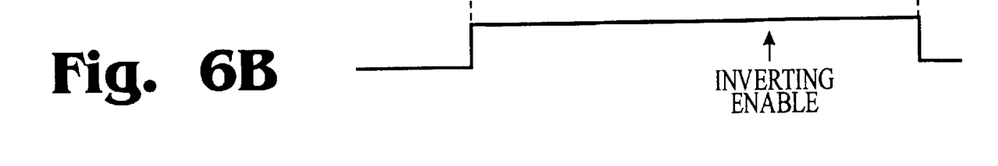

FIG. 6A illustrates a transmission state of a radio paging signal in an inverted data format, and FIG. 6B illustrates a transmission state of a battery save signal in accordance with the radio paging signal. As shown in FIG. 6A, when the inverted data is transmitted, the radio pager receives only preamble and fails to receive the first sync code and the second sync code. In this state, the battery save signal can be maintained at a high state by applying an inverted enable signal to the inverting circuit 18 as shown in FIG. 6B. If the battery save signal is maintained at the high state, the RF unit 11 of the radio pager is turned on, thereby enabling the radio pager to receive the third sync code and the inverted data. Referring now to FIG. 6A which illustrates the same radio paging signal transmitted from a paging terminal in an inverted data format as shown in FIG. 2A. When this paging signal is received by the radio pager having an inverting circuit 18 incorporated therein as shown in FIG. 3, the inverted data can be received upon detection of a sync code as shown in FIG. 6B.

Figure 7:
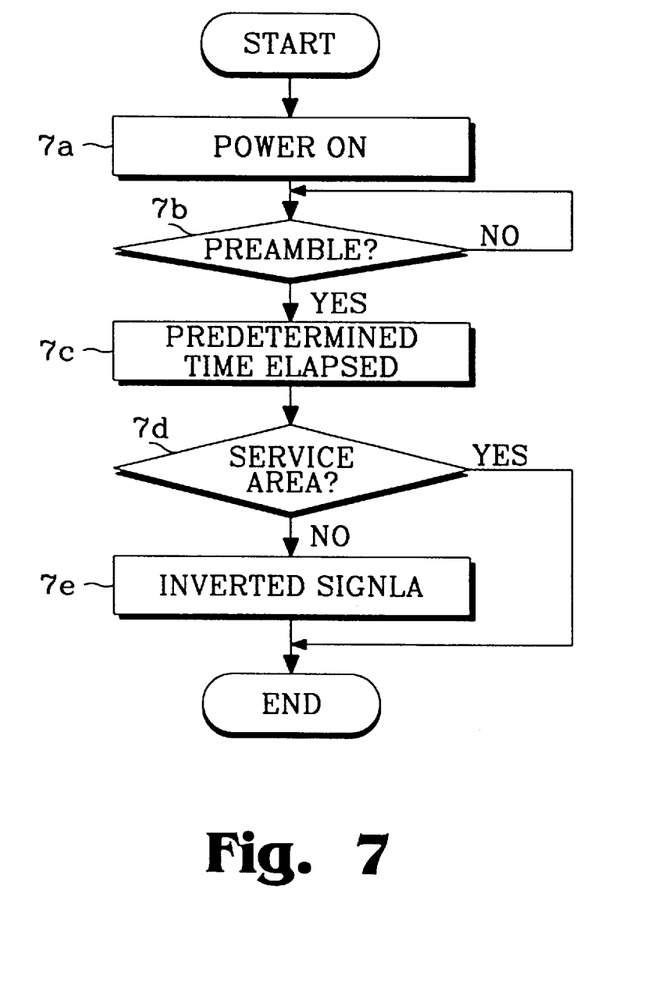
FIG. 7 is a flow chart illustrating a method of receiving an inverted radio paging signal according to the principles of the present invention.

Refer now to FIG. 7 which illustrates a method of receiving an inverted radio paging signal according to the principles of the present invention. First, the controller 13 accesses its own cap-code and a reference channel frequency stored in the memory 15 when the power is turned on at step 7a. The controller 13 then determines whether a preamble of a paging signal is synchronized with the reference channel frequency at step 7b. As described above, it is possible to receive a paging signal in an inverted data format in two ways. A sync code can be received after a predetermined time period (2 batches including a sync code). The controller 13 decides whether to activate a circuit for receiving a normal paging signal or to activate a circuit for receiving an inverted paging signal by confirming an area being serviceable at step 7d after the elapse of a predetermined time period at step 7c. If the service area is not confirmed at step 7d, an inverted paging signal is received at 7e.

Figure 8:
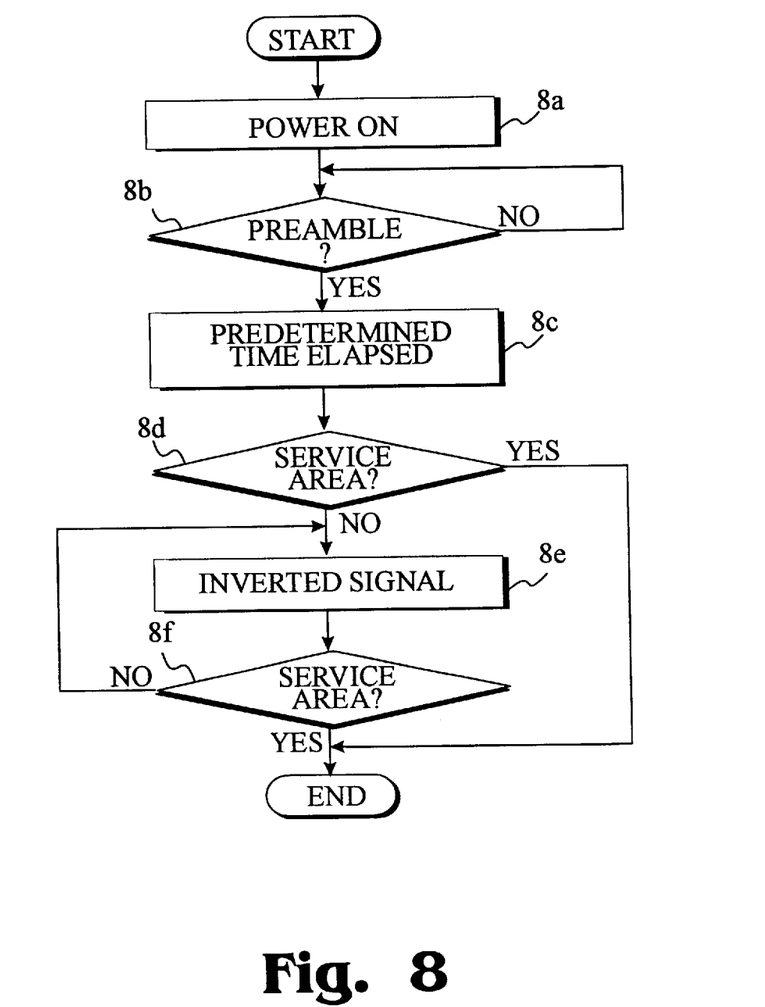
FIG. 8 is an another flow chart illustrating a method of receiving an inverted radio paging signal according to the principles of the present invention.

FIG. 8 illustrates another method of receiving an inverted radio paging signal according to the principles of the present invention. The process of generating an initial inverted paging signal is the same as that of the process as shown in FIG. 7, except for the repeated production of an inverted paging signal even if sync code is not detected or the area is not serviceable after driving the circuit for receiving an inverted paging signal. Considering that the sync code is not available in a weak current, it is inverted reversely again and the detection process is continued by changing an on-off period when the sync code is not found in reversing the inverted signal.

Figure 9A:
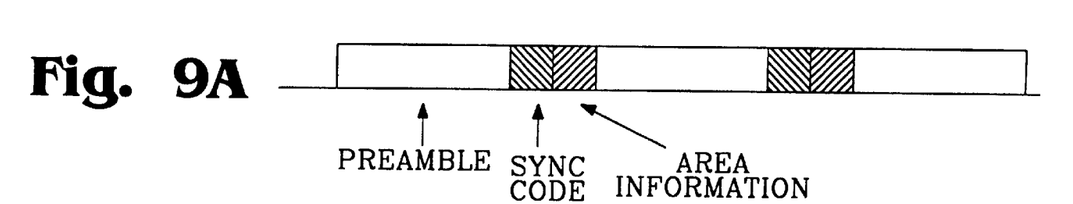
FIGS. 9A and 9B illustrate a waveform of a paging signal received by a radio pager constructed according to the principles of the present invention.
Figure 9B:
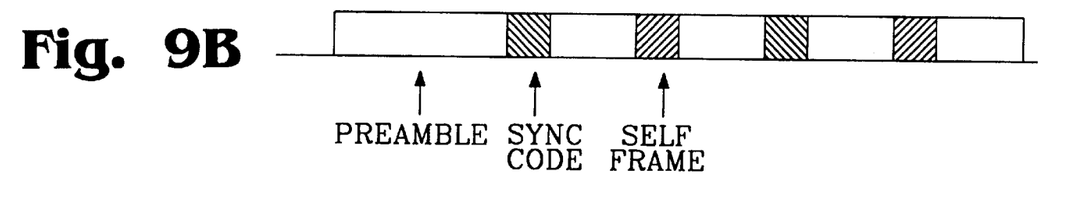

FIG. 9A illustrates an area information that is detected from an inverted paging signal in the same channel, and FIG. 9B illustrates a location of a cap-code and a message in each frame of a normal paging signal in the same channel. It is noted that two different channels are required for detecting an area information and a service channel data by a normal paging signal.

The controller 13 accesses its cap-code, a reference channel frequency and a service channel frequency stored in the memory 15 and confirms whether a data is received or not by synchronizing with the reference channel frequency. At this time, a normal paging signal is received by letting an inverting enable signal S3 being "0". After analyzing an area information of a cap-code of a received paging signal, the received paging signal transferred from the RF unit 11 to the decoder 12 is inverted in the inverting circuit 18 by letting the inverted signal S3 being "1" before receiving an actual paging signal by synchronizing with a relevant service channel.

As described above, it is possible to recognize an inverted paging signal transmitted from a paging transmitter in a wide band area. The inventive method has an advantage to double the effect of power saving by enabling a radio pager to process a normal paging signal or an inverted paging signal selectively and adjusting a data format to be transmitted.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for receiving a paging signal in one of a normal transmission format and an inverted transmission format in a radio pager, comprising the steps of:

detecting a preamble of a paging signal by reading a cap-code identifying an inherent address of said radio pager and synchronizing with a reference channel frequency; determining a transmission format of said paging signal to be received by confirming whether a local area of said radio pager is serviceable according to the detection of a synchronization code after a predetermined time period; and receiving said paging signal in an inverted transmission format by inverting said paging signal when the local area of said radio pager is not serviceable, and receiving said paging signal in an normal transmission format when the local area of said radio pager is serviceable.

2. The method of claim 1, further comprised of said paging signal being transmitted in a Post Office Code Standardization Advisory Group (POCSAG) code format comprising said preamble of a predetermined duration followed by a series of batches with each batch including a synchronization code followed by successive frames with a designated frame containing said cap-code for identifying said inherent address of said radio pager.

3. The method of claim 2, further comprised of alerting a subscriber of an incoming call when the received paging signal contains the cap-code and message data in said designated frame of each successive batch.

4. The method of claim 2, further comprised of providing a visual display of a data message intended for a subscriber when the received paging signal contains the cap-code and message data in said designated frame of each successive batch.

5. A paging system, comprising:
   a base station including a base transmitter for transmitting a paging signal including a preamble followed by a series of batches of paging information, each batch including successive frames containing a cap-code and service area location information; and
   a subscriber pager comprising:
      a receiver for receiving the paging signal from the base transmitter;
      a memory for storing a local cap-code representing a self address of the subscriber pager;
      a controller for checking whether a received paging signal contains the cap-code and service area information in each batch subsequent to said preamble in dependence upon the local cap-code stored in said memory to determine the serviceability of a service area location of the subscriber pager;
      an inverting unit for inverting a transmission format of the received paging signal, when the service area location of the subscriber pager is not serviceable;
      a decoder connected to the inverting unit, for selectively supplying power to said receiver and decoding the received paging signal via the inverting unit in one of a normal transmission format and an inverted transmission format, when the received paging signal contains the cap-code and the service area location information in each batch subsequent to said preamble in dependence upon the local cap-code stored in said memory; and
      a frequency synthesizer for synthesizing a channel frequency of said service area location of the subscriber pager.

6. The paging system of claim 5, further comprised of said received paging signal being transmitted in a Post Office Code Standardization Advisory Group (POCSAG) code format comprising said preamble of a predetermined duration followed by a series of batches with each batch including a synchronization code followed by successive frames with a designated frame containing said cap-code for identifying said self address of said radio pager.

7. The paging system of claim 5, further comprised of said subscriber pager comprising alert means for alerting a subscriber of an incoming call when the received paging signal contains the cap-code and service area location information in each successive batch.

8. The paging system of claim 5, further comprised of said subscriber pager comprising a display unit for providing a visual display of a data message intended for a subscriber when the received paging signal contains the cap-code and message data in each successive batch.

9. A method for receiving a paging signal in one of a normal transmission format and an inverted transmission format to maximize a usable channel frequency in a radio pager comprising a radio-frequency unit and circuit for processing said paging signal, said method comprising the steps of:
   activating said radio-frequency unit to receive said paging signal including a preamble followed by a series of batches of paging information, each batch including successive frames containing a cap-code and service area location information;
   determining whether the preamble of said paging signal is synchronized with a reference channel frequency;
   when the preamble of said paging signal is synchronized with said reference channel frequency, determining in dependence upon service area location information contained in said paging signal, whether a service area location of the radio pager is serviceable;
   when the service area location of the radio pager is determined to be not serviceable, inverting a transmission format of said paging signal and then processing said paging signal in an inverted transmission format for reception of a data message contained in said paging signal; and
   alternatively, when the service area location of the radio pager is determined to be serviceable, directly processing said paging signal in a normal transmission format for reception of said data message contained in said paging signal.

10. The method of claim 9, further comprised of said paging signal being transmitted in a Post Office Code Standardization Advisory Group (POCSAG) code format comprising said preamble of a predetermined duration followed by a series of batches with each batch including a synchronization code followed by successive frames with a designated frame containing said cap-code for identifying said inherent address of said radio pager.

11. The method of claim 10, further comprised of alerting a subscriber of an incoming call when the received paging signal contains the cap-code and the data message in each successive batch.

12. The method of claim 10, further comprised of providing a visual display of a data message intended for a subscriber when the received paging signal contains the cap-code and data message in each successive batch.

* * * * *